Sept. 26, 1961 W. P. WARTHEN 3,001,438
APPARATUS FOR DETERMINING DIAMETERS OF MOVING BODIES
Filed July 9, 1957 5 Sheets-Sheet 1
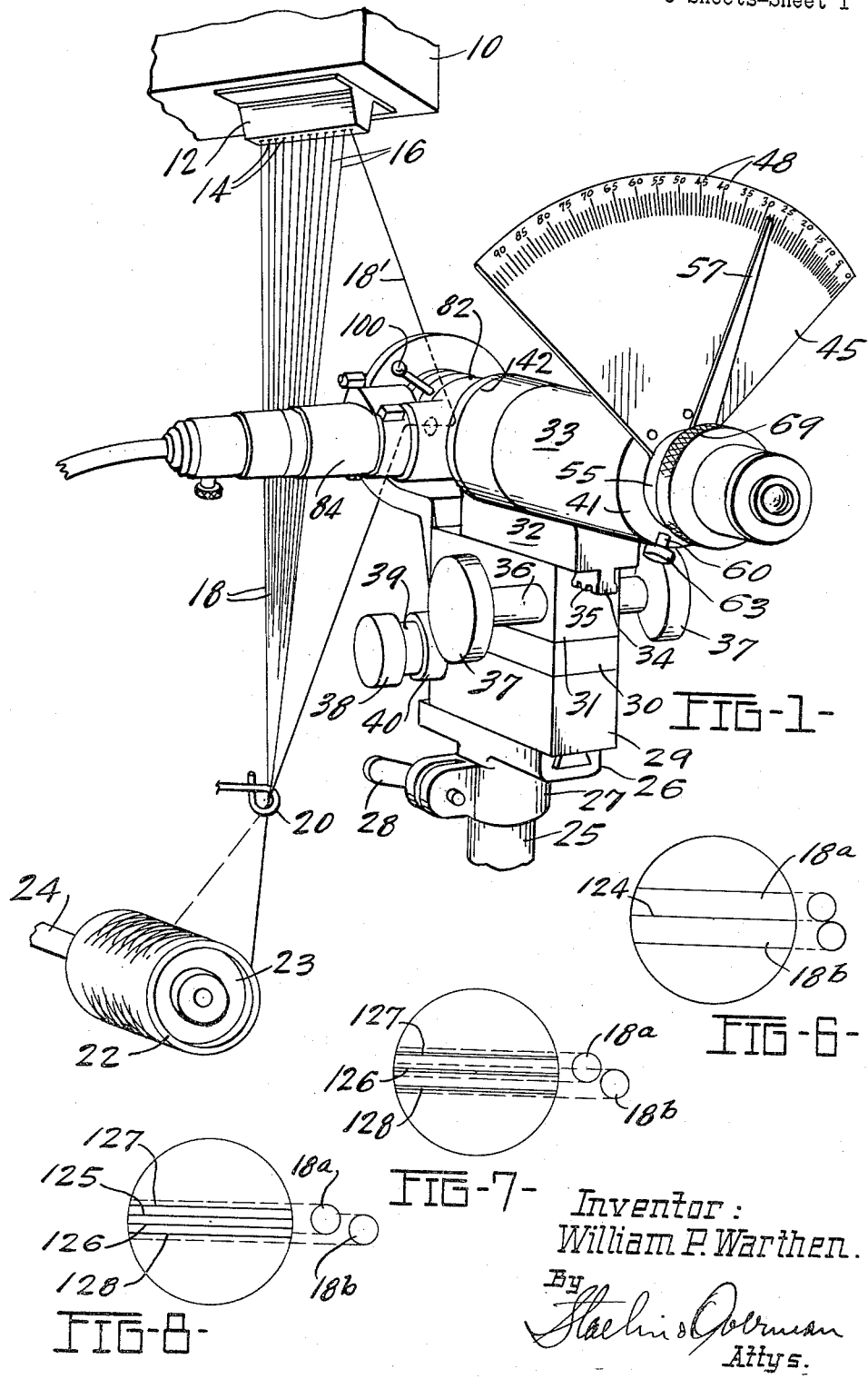
Inventor:
William P. Warthen.
By
Attys.

Sept. 26, 1961 W. P. WARTHEN 3,001,438
APPARATUS FOR DETERMINING DIAMETERS OF MOVING BODIES
Filed July 9, 1957 5 Sheets-Sheet 2
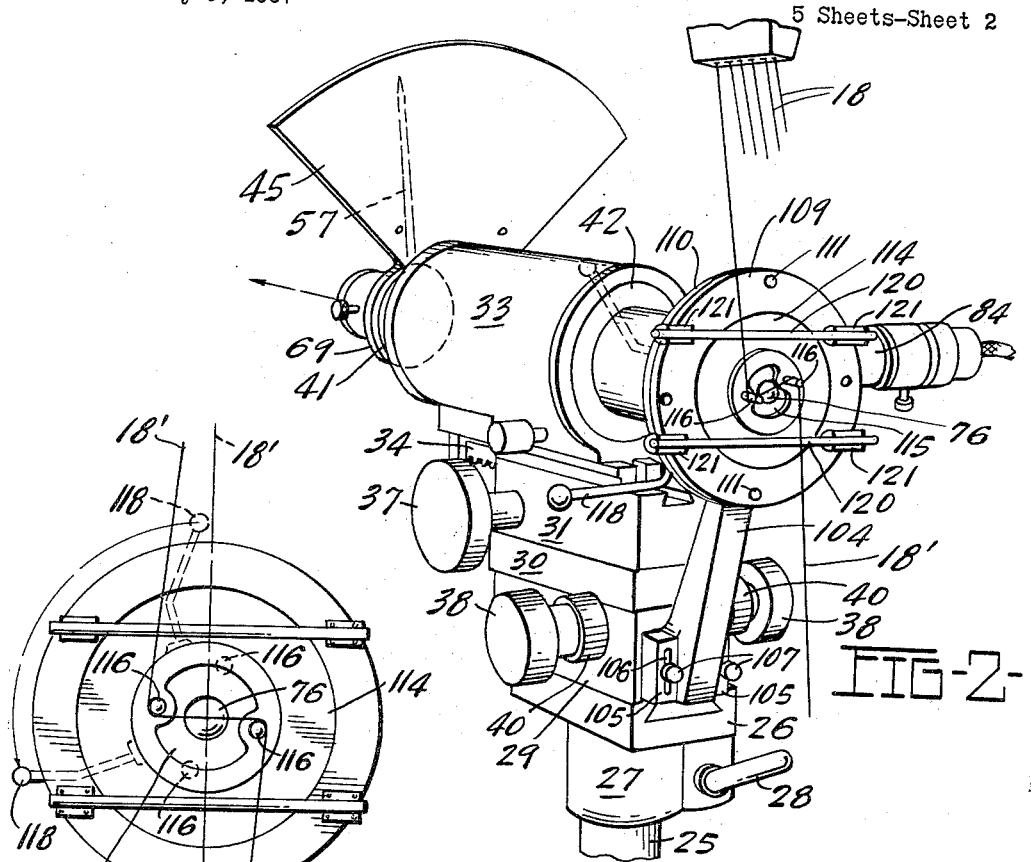
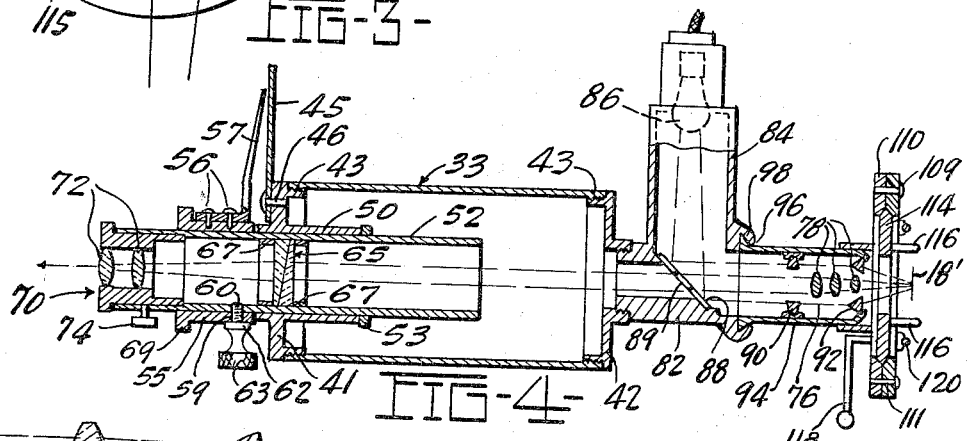
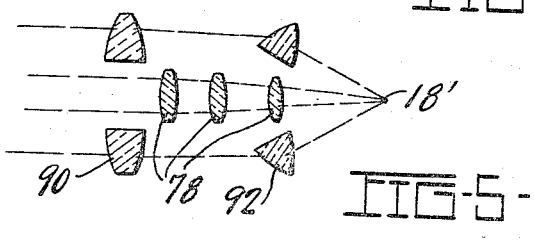
Inventor:
William P. Warthen.
By
Staehn & Overman
Attys.

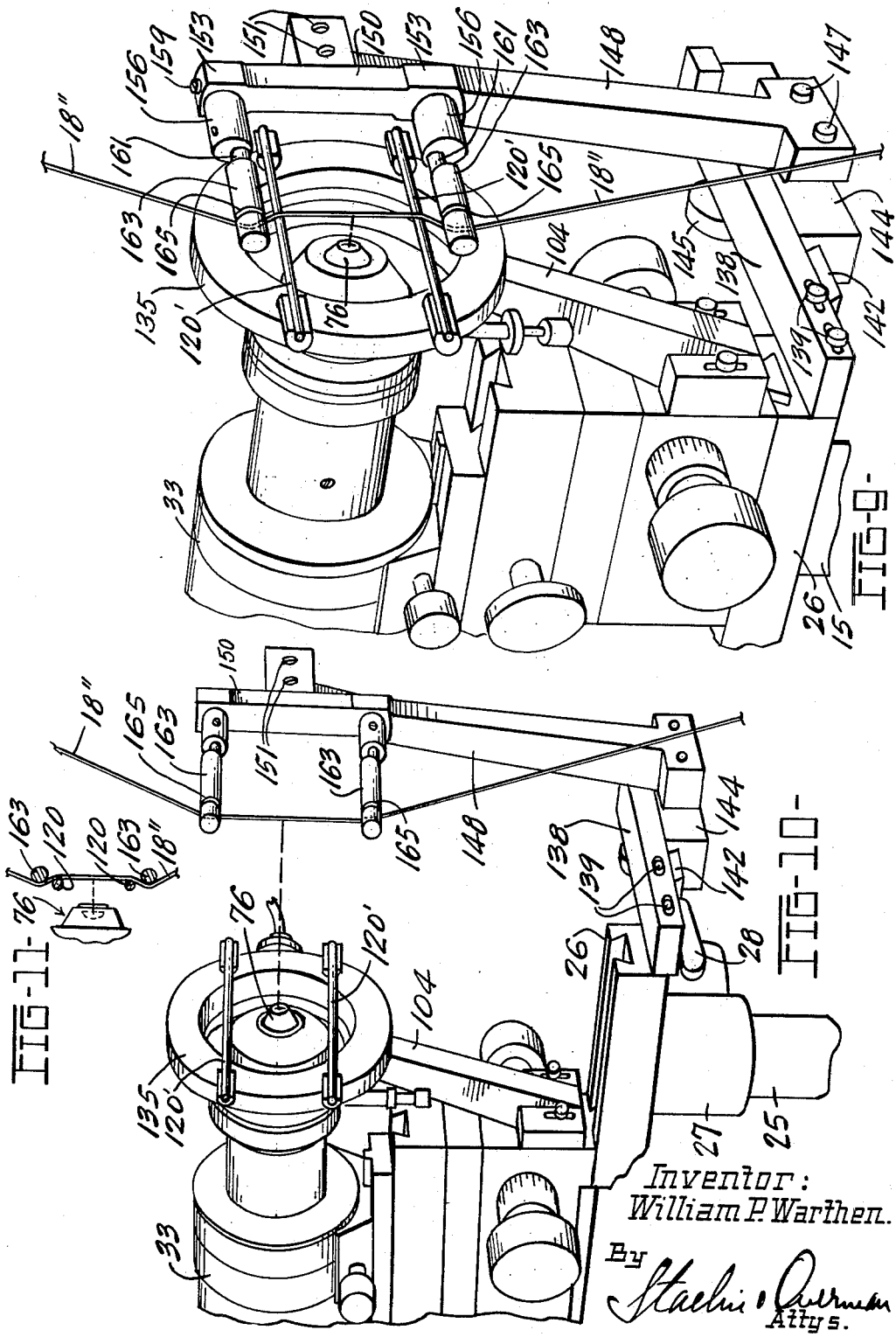

Sept. 26, 1961 W. P. WARTHEN 3,001,438
APPARATUS FOR DETERMINING DIAMETERS OF MOVING BODIES
Filed July 9, 1957 5 Sheets-Sheet 4
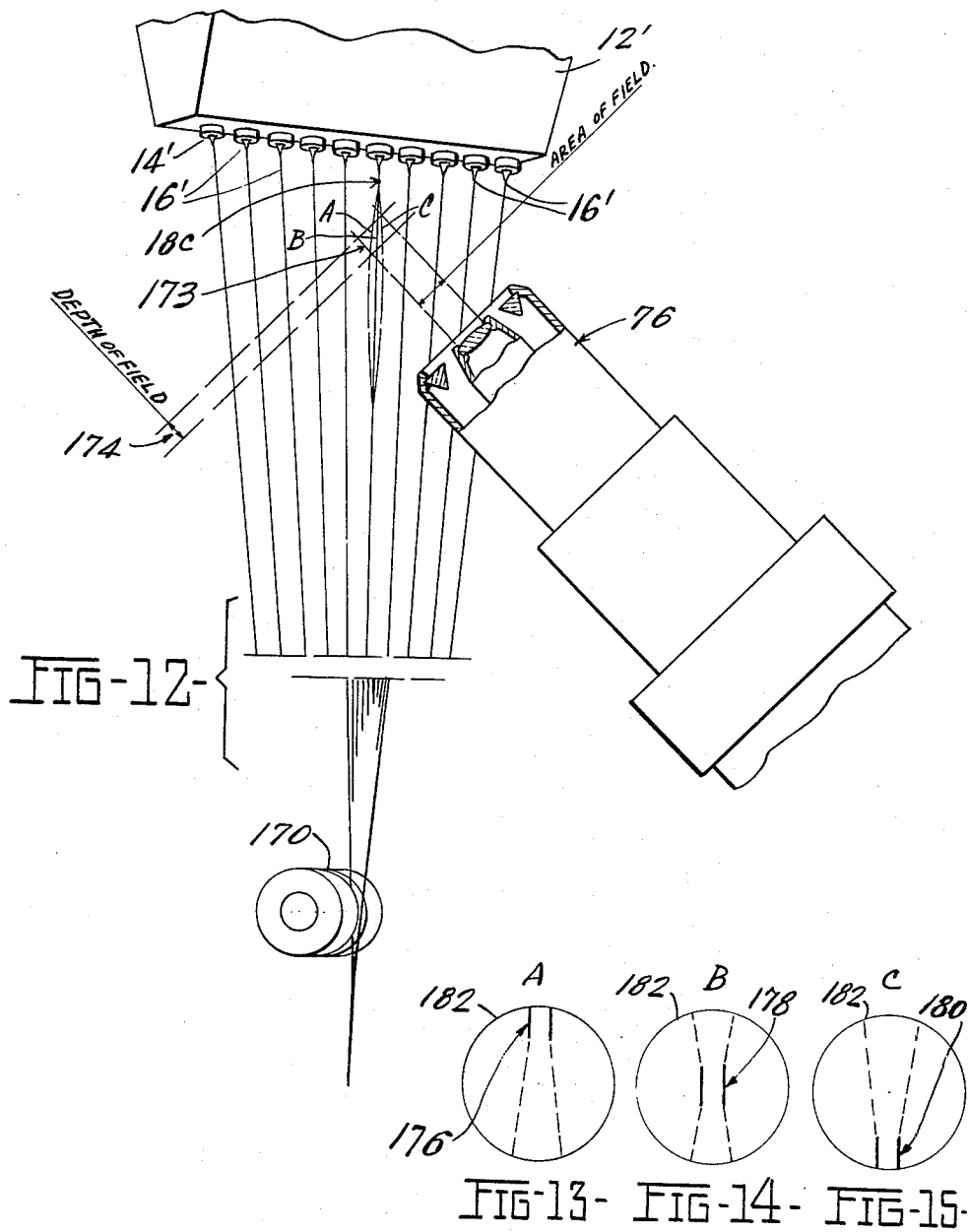
Inventor:
William P. Warthen
By
Attys.

Sept. 26, 1961  W. P. WARTHEN  3,001,438
APPARATUS FOR DETERMINING DIAMETERS OF MOVING BODIES
Filed July 9, 1957  5 Sheets-Sheet 5
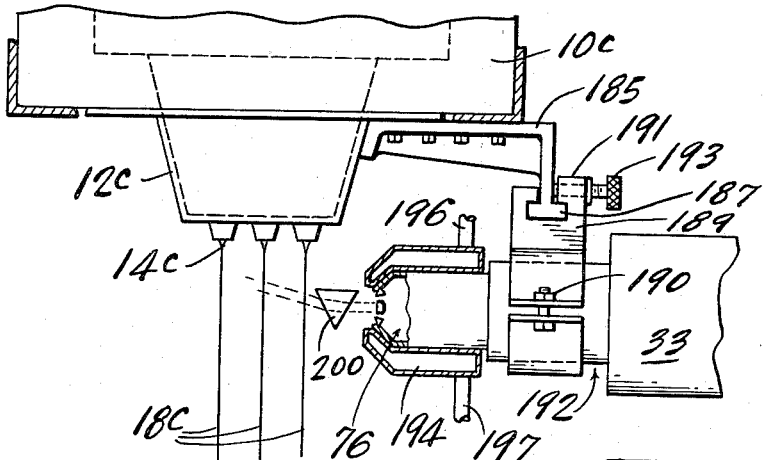
FIG-16-
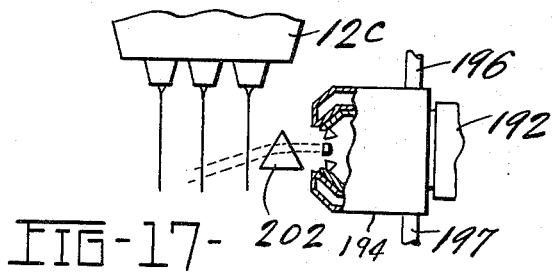
FIG-17-
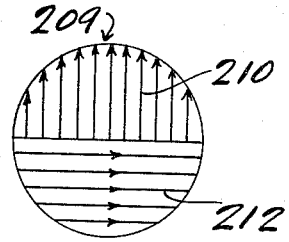
FIG-18-
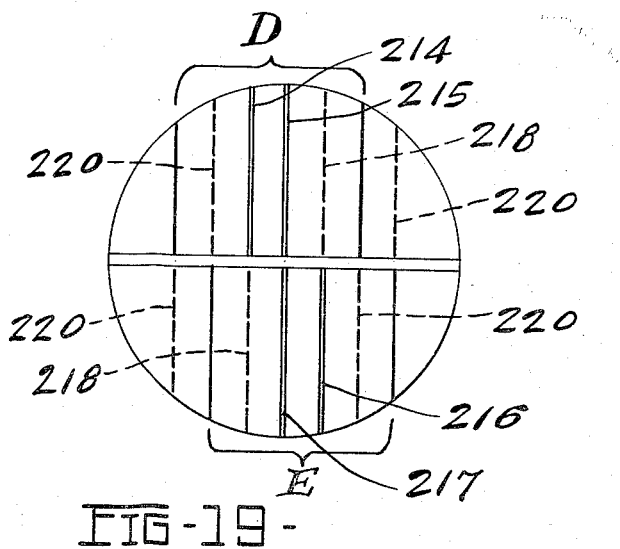
FIG-19-
Inventor:
William P. Warthen
By Machin Oberman
Attys.

United States Patent Office 3,001,438
Patented Sept. 26, 1961

3,001,438
APPARATUS FOR DETERMINING DIAMETERS OF MOVING BODIES
William P. Warthen, Newark, Ohio, assignor to Owens-Corning Fiberglas Corporation, a corporation of Delaware
Filed July 9, 1957, Ser. No. 670,732
9 Claims. (Cl. 88—14)

This invention relates to apparatus for accurately determining the diameters of moving bodies and more especially to apparatus for determining the diameters of filaments or fibers formed from various filament-forming materials such as glass, slag, fusible rock, resins or the like while the same are moving at comparatively high linear speeds.

Heretofore in the manufacture of continuous filaments or linear bodies of circular cross section, it has been conventional practice in ascertaining the diameter of the filament or body to break out a length thereof and place the same under a microscope for examination. Such method of testing often necessitates interruption of the filament-forming operation. Furthermore such checking or testing for filament diameter is intermittent and very often large quantities of filaments or bodies of incorrect or improper size are produced before the defect in diameter or size is detected. Such procedure results in large quantities of waste materials.

It is imperative in fabricating textiles that the filament diameters be accurately maintained. Another factor having an important bearing upon the production of fine textile filaments, especially those formed from heat softened materials such as glass, is that the operating conditions of attenuation may vary within a short period of time. For example, a minor deviation in temperature at the feed bushing affects the viscosity of the glass which condition directly affects the fineness or diameter of the filaments being attenuated. Attempts have been made to initiate a continuous check or test of filament diameters but no satisfactory method has heretofore been attained.

The present invention embraces determining the diameter of a moving filament or body concomitantly with the filament or body forming operation and without breaking out or disrupting the filament or body and without interrupting the attenuating or forming operations.

An object of the invention embraces apparatus wherein an optical system is utilized in conjunction with a suitable indicating means for accurately determining the diameter of a filament or linear body while attenuation or formation is being carried on and without interruption of the traverse of the filament or body.

Another object of the invention resides in an optical system and apparatus adapted for installation in a position of use adjacent a multi-stream feeder or bushing wherein the apparatus may be adjusted or positioned to selectively test a moving filament for diameter size without impairing or interrupting the traverse of the filament being tested.

Another object of the invention resides in an optical system for determining the diameter of linear material while the same is in motion utilizing an image doubling element or image multiplying prism and employing the visual relative positions of the images or light bands reflected from the linear material for the purpose.

Another object of the invention is the provision of an optical system adaptable for use in accurately determining the thickness of a coating or layer on a moving filament or linear object.

Another object of the invention resides in the provision of an apparatus embodying an optical system adaptable for measuring the diameter of a moving filament or object through the visual relation of optical images of the filament or the relation or visual position of bands of light reflected from the filament or object in conjunction with a suitably calibrated scale affording a direct reading of the diameter or size of the filament or other linear object.

Another object of the invention resides in the provision of an instrument embodying an optical system equipped with means for guiding or positioning a moving filament or linear object in a relatively fixed focus position with respect to the optical system or which may be satisfactorily employed to scan or embrace an optical field in the path of traverse of a moving filament or linear object without a guiding means engaging the same.

Another object of the invention resides in a measuring apparatus particularly adapted for measuring the diameter of a filament or linear body formed of glass wherein the apparatus may be positioned adjacent the glass feeder and the region of attenuation whereby the light transmitted from the intensely hot bushing and the cones of molten glass from which the filaments are drawn provides illumination for visual filament measuring purposes.

Still another object of the invention resides in an apparatus embodying an optical system for measuring diameters of filaments equipped with a split polarizing filter in combination with an image doubling element whereby an indication of filament diameter is obtained by the establishment of a predetermined abutting relation of split images of the filament or split images of bands of light reflected from the filament.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an isometric view illustrating a form of apparatus of the invention disposed to accommodate a moving continuous filament or body directed through the optical field of the apparatus;

FIGURE 2 is an isometric view of the instrument or apparatus illustrating the position of a continuous filament traversing a path through the optical field of the instrument;

FIGURE 3 is an end view of the arrangement shown in FIGURE 2 showing one form of the filament guiding means;

FIGURE 4 is a semi-diagrammatic longitudinal sectional view illustrating components of the optical system and associated filament diameter measuring means of the invention;

FIGURE 5 is a diagrammatic view showing lens components and light beam condensers embodied in the instrument or apparatus shown in FIGURE 4;

FIGURE 6 is a diagrammatic view illustrating relative positions of images for obtaining an indication or reading of the diameter of a filament or linear body;

FIGURE 7 is a view similar to FIGURE 6 illustrating the relative positions of bands of light reflected from a filament or linear body for measuring or size comparison purposes;

FIGURE 8 is a view similar to FIGURE 7 illustrating another relative position of images of reflected light bands employed for measuring or comparison purposes;

FIGURE 9 is an isometric view of a portion of the optical instrument or apparatus showing a modified form of means for maintaining a moving filament or body in the optical field;

FIGURE 10 illustrates a component of the filament guiding means of FIGURE 9 in filament engaging position preparatory to adjusting the optical measuring apparatus into filament measuring position;

FIGURE 11 is a fragmentary sectional view illustrating the path of traverse of a filament as influenced by the guiding means shown in FIGURES 9 and 10;

FIGURE 12 is a semi-diagrammatic view illustrating a position of use of the fiber diameter determining instrument disposed adjacent a glass feeder or bushing;

FIGURE 13 is a diagrammatic view showing a position of focus of a filament traversing one region of the optical field;

FIGURE 14 is a similar view illustrating a position of focus of a filament in another region of the optical field;

FIGURE 15 is a view similar to FIGURE 13 illustrating a position of focus of a filament in another region of the optical field;

FIGURE 16 is a fragmentary sectional view illustrating the optical instrument or apparatus disposed adjacent a feeder or bushing containing filament forming material and arranged for adjustment for selectively measuring the diameter of any filament of a group;

FIGURE 17 is a fragmentary view illustrating a prism arrangement for establishing an optical field inclined with respect to the axes of travel of the filaments;

FIGURE 18 is a diagrammatic view illustrating a split polarizing filter utilized to visually abut images of the filaments or reflected light bands, and FIGURE 19 is a diagrammatic view illustrating the visual positions of the reflected light bands and filament images as viewed through the polarizing filter illustrated in FIGURE 18.

While the instrument or apparatus of the invention is particularly adapted for carrying out or performing a method of determining with a high degree of accuracy the diameters of filaments formed from glass, other mineral materials, resins or the like, it is to be understood that the method and instrument or apparatus of the invention may be utilized for measuring the diameters of other bodies which may be caused to traverse an optical field or for measuring coatings or layers of material applied to filaments or other linear bodies.

Referring to the drawings in detail, a form of the invention is illustrated in FIGURES 1 through 5. With particular reference to FIGURE 1, a form of the invention is shown in a position of use for indicating or ascertaining the diameter of a rapidly moving continuous filament formed of heat-softened mineral material, such as glass, slag or fusible rock. A forehearth 10 containing a supply of heat-softened or flowable glass is connected with a melting furnace (not shown) in which the glass batch is reduced to a molten condition. Disposed beneath the forehearth 10 is a feeder or bushing 12 having a bottom wall formed with one or more rows of orifices or outlets 14 through which the molten material flows in individual streams 16 from which continuous filaments 18 are formed. The continuous filaments 18 converge through a gathering loop 20 or other suitable guide means to bring the filaments into the form of a sliver or strand which is wound upon a sleeve 22 mounted upon a collet 23 carried by a shaft 24. The sleeve 22 is rotated at a high surface speed of several thousand linear feet per minute, which operation continuously attenuates the streams 18 into filaments 18.

The diameters of the filaments are determined primarily by three factors, the size of the outlets or the orifices 14 in the feeder, the viscosity of the glass or other filament forming material and the linear speed of attenuation.

Filaments attenuated from streams of material flowing from circular orifices are substantially perfect circular cylindrical bodies, and filaments of glass or other reflective material will reflect incident or transmitted light in a band or bands which are parallel with the axis of the filament. The spacing of the reflected bands of light is a function of the diameter of the filament or a body of circular cross section and it has been found that the reflected bands of light may be utilized as a visual factor or indicator for determining the diameter of the filament or body.

Thus a reflected light band may be used as an index or end point in determining size or for comparison purposes. The arrangement of the present invention embodies a filament or body scanning system incorporating an image doubling or image multiplying element or component associated with means for effecting relative movement between the image doubling or multiplying element and the body or filament to be measured or compared whereby the resultant multiple images of reflected bands of light may be utilized to determine with extreme accuracy the diameter or size of the filament or body.

The arrangement or apparatus shown in FIGURES 1 through 5 for performing this method of determining the diameter of a linear body or filament may be mounted adjacent the path of traverse of a completely attenuated filament, the filament moving through an optical field of the apparatus without interrupting or impairing the rate of movement of the filament.

As particularly shown in FIGURE 1, the filament or body measuring apparatus is mounted upon a supporting member or post 25. A member 26 is provided with a hollow boss 27 which accommodates the upper end of the post 25, a wall of the boss portion 27 being split and adapted to be tightly clamped to the post 25 by a clamping member 28.

A block 29 is supported by member 26 and is adjustable lengthwise of the member. Mounted in superposed relation upon the rectangularly shaped member 29 are members or blocks 30 and 31. Mounted upon the upper surface of the member 31 is a saddle or carriage 32 which directly engages and supports a circular cylindrical housing 33. The carriage 33 is formed with a depending bar 34, the lower surface of which is serrated as at 35 forming rack teeth which are enmeshed with a pinion (not shown) contained within the member 31 and supported upon a shaft 36 extending transversely through the member 31 as shown in FIGURE 1.

The end regions of the shaft 36 at either side of member 31 are equipped with knurled knobs 37 for rotating shaft 36 and the pinion carried thereby to effect an adjustment of the housing 33 and carriage 32 longitudinally of member 31 to adjust the optical system carried by the housing 33 to obtain proper focus of the filament or body in the optical field.

A means is provided for securing a fine or minute adjustment between the frame member 29 and the intermediate block 30 which is of conventional character used for obtaining minute adjustments of compound microscopes and is arranged to be manipulated by knurled knobs 38 carried by a shaft 39, the shaft at either side of the block 29 being equipped with collars 40 bearing graduations of the character provided in a micrometer which are arranged to cooperate with an index (not shown) providing an indication of the relative position of member 30 with respect to member 29.

The housing 33 carries or supports an image doubling or image multiplying means or prism and an optical system arranged to directly indicate the diameter of a linear body or filament moving through the optical field of the apparatus. With particular reference to FIGURE 4, which is a semi-diagrammatic sectional view of the image doubling arrangement and optical system, it will be noted that the ends of the housing 33 are provided respectively with closures 41 and 42 threadedly engaged with the housing as indicated at 43.

A comparatively thin metal plate 45 is fixedly secured to the closure 41 by means of screws 46, the plate 45 being of fan shape, its obverse surface bearing a series of graduations 48 providing a chart affording a direct reading or indication of the diameter of the filament or body moving in the optical field of the apparatus. The closure 41 is formed with an elongated sleeve 50 which snugly, yet rotatably receives a barrel or circular cylindrical sleeve 52 which is equipped with a removable collar 53 or other suitable means for preventing endwise movement of the barrel 52 with respect to the sleeve 50.

Surrounding the barrel or sleeve 52 and arranged exteriorly of the housing closure 41 is a member or sleeve 55 supporting an indicating arm 57, the upper extremity of which forms an index adapted for cooperation with the graduations on the scale or plate 45. The arm 57 is secured to the sleeve 55 by screws 56.

The sleeve 55 is formed with a circumferentially arranged slot 59 accommodating a screw 60 extending into a threaded opening formed in the wall of the sleeve 52. The threaded member 60 is formed with a shoulder 62 adapted to be drawn into frictional engagement with the exterior surface of the sleeve 55 to lock the sleeve 55 to the sleeve 52. The threaded member 60 is equipped with a manipulating knob or finger piece 63. By releasing the threaded member 60, the indicator 57 and its supporting sleeve 55 may be rotated relative to the sleeve 52 for establishing an initial relation between the sleeve 52 and the indicator 57.

Disposed within the sleeve or barrel 52 is an image doubling or image multiplying element or prism 65. The image doubling or polarizing prism 65 is of the so-called Wollaston type having a relatively fixed deviation factor. The image doubling prism 65 is held in place by means of split rings 67 arranged at each side of the prism and frictionally engaging the interior wall of the sleeve 52 to prevent dislodgement of the prism.

Rotation of the barrel 52, prism 65 and sleeve 55 is facilitated through the provision of a knurled finger piece 69 formed on the sleeve 55. Rotation of the Wollaston prism 65 causes an apparent rotative movement or shifting of dual images of the filament or body in the optical field, the extent of rotation being indicated by the position of the index or arm 57 in registration with a graduation 48 on the chart 45.

Telescopically arranged in an end of the sleeve 52 is an eye piece 70 which in the embodiment illustrated is of the magnifying type embodying lenses 72. The eye piece 70 may be held in the tube by a securing screw 74.

The optical system in the embodiment illustrated is inclusive of an objective 76 including lenses 78 which are optically interrelated with the lenses 72 in the eye piece to provide substantial magnification of the optical field. As shown in FIGURES 1 through 5, one of the filaments or moving bodies designated 18' traverses a path adjacent the objective 76 in the optical field of the system.

The apparatus embodies means for directing incident light onto the moving filament or body 18' in order to provide images of multiple light bands, the relation of the bands being utilized in determining the diameter of the filament or body. Secured to the forward closure 42 of the housing 33 is a sleeve or member 82 equipped with a transversely extending casing or housing 84 containing a light source 86 of the electrically energizable type.

Secured to the member 82 and arranged at an angle of 45° to the axis of the housing 84 is an annularly shaped mirror 88 having a central opening 89. The reflecting mirror 88 is arranged to project a substantially annular beam of light from the source 86 through suitable ring condensers or light condensing means 90 and 92 associated with the objective 76. The diagrammatic arrangement of the magnifying lenses 78 and the light condensing means 90 and 92 are illustrated in FIGURE 5.

The lenses of the objective 76 and the light condensers are housed or enclosed within a sleeve or fitting 94 provided at one end with a dove-tail like projection 96 adapted to fit in a correspondingly shaped recess in a circular flange 98 formed on the sleeve 82 as shown in FIGURE 4. The dove-tail like connecting means 96 and 98 is of conventional construction used for securing a lens assembly or objective to a support. The objective 76 may be removed by partially rotating the sleeve to disconnect the dove-tail configuration 96 from the flange 98. A handle 100 is secured to the sleeve 94 to effect its rotation and disconnection when desired.

When the apparatus of the invention is utilized for determining the diameter of an extremely fine filament or fiber of a few hundred thousandths of an inch in diameter, substantial magnification in the compound lens or optical system is desirable. As an example of practical application, the eye piece lens arrangement may be of fifteen power magnification and the objective lens system 76 of twenty-two power providing a total magnification of 330 diameters.

The Wollaston prism or image doubling means 65 employed with a compound lens system of the magnification above mentioned is fashioned with a very small angle of deviation, as for example, zero degrees and minutes and twenty seconds. An image doubling prism of this character used with the magnification above mentioned provides ample visual shifting or relative movement of the dual images of the filament to give an indication of a change or variation of filament diameter determinable to a fraction of one hundred thousandths of an inch.

If linear bodies or objects of greater diameters are moved through the optical field, the magnification provided by the lens system may be reduced or even dispensed with entirely where the moving body may be a wire, tube or the like of substantial diameter.

In the embodiment illustrated in FIGURES 1 through 5, the apparatus is inclusive of a filament or body guiding or directing means for maintaining the filament or body in sharp focus in the optical field or area even though the filament or body is moving at a speed of several thousand feet per minute.

FIGURES 1 through 4 illustrate one form of means for guiding or directing the filament through the optical field, the arrangement including an arm 104 formed at its lower end with projections 105 provided with slots 106 accommodating securing bolts 107 which extend into threaded openings formed in the forward region of the frame block 29 as particularly shown in FIGURE 2. Supported at the upper end of the arm 102 is a pair of rings designated respectively 109 and 110 which are secured together by screws 111.

The interior regions of the rings 110 and 111 are recessed to journally support a disc-like member 114 formed with a central aperture 115 to accommodate the objective lens system 76 and to facilitate the projection of the light beam from the condensers 92 onto the moving filament or body 18'. Secured to the disc-like member 114 are projecting pins 116 arranged to engage the filament and guide the same through the optical field in a direction substantially normal to the usual path of the filament. The disc-like member 114 carrying the pins 116 may be rotated by a manipulating handle 118.

Fixedly secured to the forward surface of the annulus 109 are rods or guides 120 preferably formed of graphite or other material which is resistant to wear by reason of contact of the moving filament therewith. The graphite rods 120 are held in place by means of clips or supports 121 secured to the annulus 109. The rods 120 serve to maintain the moving filament in proper focus of the lens system while the pins 116 tension the filament in the scanning or optical field. FIGURE 3 illustrates in broken lines the relation of the pins 116 to the filament 18' before the filament is engaged by the pins. Upon movement of the handle 118, with the filament in engagement with the graphite rods 120, the disc 100 is rotated approximately 90° to the full line position of the pins indicated in FIGURE 3, this position assuring that the filament continuously moves in proper focus in the optical field and is tensioned to avoid whipping or oscillation which might otherwise be occasioned by reason of its high linear speed and ambient air currents. The pins 116 are preferably formed of graphite or other suitable material having a high resistance to wear.

The system of the invention provides a continuously available means for obtaining an indication of any change in the diameter of a moving filament or body, as a minute change in size effects a substantial shift or modification in the relative positions of the dual images of the filament or body and dual images of reflected bands of light resulting from the projection of the beam of light from the source 86 onto the filament or body.

In the use of the apparatus, the instrument is adjusted to bring the graphite rods 120 into light contact with a filament 18' selected from the group of filaments 18. The disc 114 is then rotated by means of a handle 118 whereby the pins 116 engage and redirect the selected filament 18' to traverse the path indicated in full lines in FIGURE 3, the path of the filament between the pins being through the optical field. The indicator hand 57 is adjusted by changing the position of the sleeve 55 with respect to the barrel 52 so that the graduation 48 in registration with the hand represents the correct diameter for the filament 18'.

The knobs 37 and 38 are then manipulated to bring the lens system carried by the housing 33 to a position wherein the filament 18' traversing the optical field is in sharp or critical focus. In taking a reading, the operator scans the optical field through the eye piece 70 and rotates the sleeve 55 and the image doubling prism or element 65 until the dual images of bands of reflected light from the filament are brought to a predetermined relation constituting the end point or indication of the diameter of the filament being measured.

Several methods of indication may be employed for determining the diameter of the filament. FIGURES 6, 7 and 8 exemplify three different indices or relationships of the dual images of the filament or the multiple light bands reflected therefrom for indicating filament diameter. When the prism 65 is rotated, the dual visual images appear to move between limits of spaced relation to a position wherein the filament images are superimposed as a single image.

As shown in FIGURE 6, an abutting or touching of the images of the filament may be utilized as an end point or indication determining the diameter of the filament. The filament images are indicated at 18a and 18b with their inner adjacent boundaries just touching each other as indicated by the line 124. With the filament images in this visual relation, the graduation on the plate 45 in registration with the indicator 47 provides a direct reading of the filament diameter. In the illustrated embodiment the graduations are in hundred thousandths of an inch although other units of measurement and lens magnification of different power may be utilized dependent upon the relative size of the body to be measured and the degree of accuracy desired.

Due to the fact that the accuracy of the indication of filament diameter is premised upon a visual congruence of the boundaries of the filament image at the line 124, certain skill may be required to establish this visual condition of touching images so as to avoid adjusting the images to a very slight overlapping condition which would result in an erroneous indication of filament diameter.

FIGURE 7 illustrates another method of determining an indication of filament diameter utilizing the bands of light reflected from the cylindrical surface of the filament being measured. The width of the reflected light band is a function of the curvature of the filament surface. Therefore the diameter of the filament, and an extremely minute change in the diameter of the filament affects a substantial change in the positions and widths of light bands reflected from the filament.

When the filament images 18a and 18b are not visually overlapped, two reflected light bands are visible on each filament image by the image doubling prism 65 so that there are four reflected light bands visible to the operator. An end point or indication of the diameter of a filament may thus be predicated upon a superposing of the right light band of the left filament image and the left light band of the right filament image.

FIGURE 7 is illustrative of this condition where the center light band 126 is a superposition of two bands, the remaining band of light of each image being identified at 127 and 128. In utilizing this method of measuring the diameter of a filament, the operator rotates the Wollaston prism 65 by rotating the sleeve 55 until two light bands (one from each filament image) are completely superposed to form the light band 126, this being determined when the width of the light band 126 is visually equal to the width of the other light bands 127 and 128.

When this condition obtains, the graduation 48 on the plate 45 in registration with the indicator 47 provides the measure of the filament diameter. If the operator notes a shift in the position of the superposed light bands from the pattern illustrated in FIGURE 7 indicating a change in filament diameter, a readjustment of the Wollaston prism is made by rotating the same until light band superpositioning is again effected. The different position of the indicator 57 relative to the chart provides a reading of the change in diameter of the filament.

FIGURE 8 illustrates another method in securing a reading of the filament diameter. The filament images 18a and 18b provide reflected light bands 125, 126, 127 and 128, the bands being of equal width. The end point providing a correct reading of the filament diameter may be determined when the four light bands illustrated in FIGURE 8 are visually equally spaced apart. When the pattern of light bands of FIGURE 8 is visible to the operator, the position of the hand 57 with respect to the chart 45 gives the measurement of the diameter of the filament. Any infinitesimally small change in the diameter of the fiber will affect a substantial visual shifting of the light bands from the pattern shown in FIGURE 8, indicating to the operator that the diameter of the filament has changed. By manipulating the sleeve 55 to rotate the prism 65 and again visually reestablish the light band pattern of FIGURE 8, the indicator 57 will provide an indication of the diameter of the changed filament.

The operator is thus alerted to correct the filament size by changing the heating or temperature of the material in the feeder bushing 12 or if the orifice producing the filament 18' is worn and therefore increased in size, the feeder is replaced or the orifice resized or other measures taken to assure the continuous production of filaments of the desired diameters.

While any of the filaments from a group such as that illustrated in FIGURE 1 may be selected for continuous tests in the optical field of the arrangement of the invention, it has been found that a feeder or bushing 10 is generally uniformly heated from end to end and hence any one filament of a row generally gives a correct reading or size for all of the filaments of the row except when an orifice becomes worn or foreign matter partially obstructs an orifice.

The relative positions of the filament images or a shift in the images may be obtained as described by rotating the image multiplying prism 65 or by displacing the image multiplying prism relative to the distance of the prism from the body. The magnifying lens system is highly desirable in order to obtain accurate indications of the diameter of a linear body which is of extremely small diameter such as attenuated continuous filaments 18 formed of glass or other heat-softenable mineral material.

The image doubling or image multiplying prism 65 may however be utilized without a magnifying lens system where the moving body is of substantial size such as a metal wire or a tube wherein the exterior surfaces are of circular cylindrical character and the dual images and their relative positions under the influence of rotation or displacement of the image doubling prism 65 provides a sufficiently accurate indication through the cooperation of the arm 57 with the graduations on the chart or plate 45.

Hence the method of the invention may be utilized in continuous wire drawing or tube extruding processes for determining wear of the dies or other defects in the wire or tube forming operations which impair or change the diameters thereof.

While the arrangement in FIGURES 1 through 5 utilizes an internal light source for producing an incident circular beam of light, it is to be understood that an external source of transmitted light may be directed upon the body being measured. As the image doubling or image multiplying prism 65 has a constant deviation factor, the arrangement of the invention may be advantageously used for various measuring or size comparison purposes and is particularly suitable for determining the thickness of a coating applied on the surface of a moving filament or body of known size.

It is to be understood that the end point methods above described for indicating the diameters of moving bodies and exemplified diagrammatically in FIGURES 6, 7 and 8 may be selectively employed for the purpose by proper readjustment of the indicating arm 57 with respect to the relative position of the image doubling or image multiplying prism 65.

This initial adjustment and setting of the instrument may be obtained by backing off the securing screw 60, shown in FIGURES 1 and 4, and effecting relative adjustment between the arm 57 and the sleeve 52 supporting the prism 65. With a filament of known diameter disposed in the optical field, the indicating hand 57 is moved into registration with the proper graduation 48 indicating the diameter of the body of known size.

The screw 60 may then be tightened to secure the sleeve 55 and indicating hand 57 to the sleeve or barrel 52 thus establishing an end point relation or index of the diameter of the filament with the type of image position indication selected from the methods indicated in FIGURES 6, 7 or 8.

FIGURES 9, 10 and 11 illustrate the apparatus of the invention equipped with another form of filament or linear body positioning and guiding means which may be utilized in lieu of the graphite pins 116 shown in FIGURES 2 and 3 for maintaining the moving filament or body in the optical field and in sharp focus of the optical system. The optical system, the adjusting mechanism therefor, and the supporting means illustrated in FIGURES 9 and 10 are identical with the arrangement of corresponding parts and elements shown in FIGURES 1 and 2.

The arrangement of FIGURES 9 and 10 includes a member 104 upon which is mounted a single annular member or ring 135 which is similar to the ring 109, the ring 135 supporting the horizontally disposed graphite rods 120′ which are identical with the rods 120 shown in FIGURES 2 and 3. FIGURE 9 shows the body guiding means in operative position maintaining a linear body or filament 18″ in the optical field of the objective 76.

FIGURE 10 is illustrative of the supporting structure carrying the optical system backed away or spaced from its position of use to facilitate the threading of the moving body or filament in proper relation with the guiding means. Secured to the forward face of the instrument supporting member 26 is a transversely extending bar or member 138 held in place by means of screws 139. The bar 138 is formed with a depending dove-tail shaped tang 142 which slidably supports a block or member 144.

A rack and pinion mechanism (not shown) is arranged between member 144 and the bar 138 for adjusting member 144 lengthwise of the bar. The pinion of this mechanism is equipped with a knob 145 for rotating the pinion. This arrangement facilitates lateral adjustment of the moving body 18″ in order to bring the moving body into a proper vertical position in the optical field.

Secured to member 144 by screws 147 is an upwardly extending member or strut 148, the upper end of which supports a T-shaped member 150 held in place by screws 151. Each of the arms 153 of the T-shaped member are bored to accommodate a tenon or shank formed upon a cylindrically shaped member 156, the members 156 being rotatably supported by the arms 153 and arranged to be locked in adjusted position by threaded members 159, one of which is shown in FIGURE 9.

As particularly shown in FIGURE 9, each of the members 156 is formed with a bore eccentric to the axis of rotation of each of the members, each bore being adapted to snugly, yet slidably receive tenon portions 161 on rods 163, the rods being formed of graphite or other material having high resistance to wear.

Each of the graphite rods 163 is formed with a circumferential recess or groove 165, the walls of which provide a guide means for the moving filament or body 18″. The relation of the graphite rods 120 and 163 in an operative or filament guiding position is illustrated in FIGURE 11 from which it will be apparent that the guiding means provides for maintaining the filament in a line normal to the axis of the optical system so that the moving filament or body is constantly maintained in sharp focus.

It should be noted that the filament in guided position is diverted from its normal path only a small amount by the cooperative relation of the graphite rods to establish a slight tensioning of the filament. This arrangement minimizes wear of the graphite rods as well as avoiding breakage or fracture of the body or filament being measured.

The method for optically determining the diameter of the moving body or filament by the arrangement shown in FIGURES 9 and 10 is the same as that hereinbefore described in connection with the construction shown in FIGURES 1 through 4. The operation of initially threading or positioning a filament in the optical field is as follows: The operator backs off the components bearing the optical system to the position illustrated in FIGURE 10, then manually engages a moving filament 18″ in the circumferential recesses 165 formed in the rods 163 in the manner illustrated in FIGURE 10.

The housing 33 and other components of the optical system are then adjusted forwardly of the supporting member 17 until the horizontally disposed graphite rods 120 engage the filament 18″ in the manner illustrated in FIGURES 9 and 11. It should be noted that the members 156 carrying the rods 163 may be individually adjusted relative to their supporting members 153 and, due to the eccentricity of the rods 163 with respect to members 156, the extent of deviation of the path of the filament in the optical field may be adjusted to lessen or increase the tension on the filament.

The apparatus of the invention may be disposed close to the stream feeder in a position whereby a filament or body of a group moves through the optical field and measurements of the diameter of the body or filament obtained without engaging the body or filament with a guiding means. FIGURE 12 is illustrative of such an arrangement. A feeder 12′ is provided with orifices 14′ arranged to flow streams 16′ of glass or other filament forming material which are attenuated to continuous filaments 18a which are converged by a gathering means 170 into a strand which is wound into a package upon a sleeve in the manner illustrated in FIGURE 1.

In attenuating operations of this character the continuous filaments are completely formed or attenuated within a comparatively short distance from the orifices 14′. It is desirable that the optical field of the testing or scanning apparatus be disposed as close to the region of complete attenuation of the filaments as possible when a filament guiding means is not used.

This is important as the filament focused in the optical field of the apparatus has not traversed a sufficient distance from the feeder to be subjected to appreciable vibration or oscillation caused by air currents ambient the path of traverse of the filaments which are set up by reason of the intense heat of the feeder and molten glass. It has been found that the optical field may be disposed in a region as close as about ⅝ of an inch below the tips of the cones of the streams 16′, in which region there is substantially no vibration or oscillation of the filaments.

It is, however, desirable to dispose the optical apparatus at an angle of about 45° to the path of travel of the filament to be measured so that the depth of the angularly disposed optical field may be utilized to facilitate the procurement of an optical indication of filament size even though minute vibrations of the filament may occur as the filament traverses the optical field.

As shown in FIGURE 12, the axis of the objective 76 or objective lens system of the testing apparatus is angularly disposed with respect to the filament 18c which moves through the optical field 173, the depth of which is indicated diagrammatically at 174. Thus even though the filament 18c deviates slightly, wavers or oscillates from a straight line path, it moves through the optical field and in some region of this field is in sharp focus position of the optical system.

When the optical apparatus is utilized in the manner shown in FIGURE 12, the transmitted light from the intensely hot glass streams 16′ and feeder may be utilized to illuminate the filament when the relative position of the filament images is employed as shown in FIGURE 6 as the end point in measuring the filament. When transmitted light or light from a source exteriorly of the optical apparatus is thus utilized, the light source of the character shown at 86 in FIGURE 4 may be dispensed with.

In FIGURE 12, A, B and C represent possible relative positions of vibration of the filament during traverse of the filament through the optical field 173, the position B indicating a straight line movement of the filament through the center of the optical field. FIGURES 13, 14 and 15 are diagrammatic representations of regions of the moving filament 18c in the three positions of traverse designated A, B and C in FIGURE 12. The representations of FIGURES 13, 14 and 15 indicate a single filament image when the image doubling prism is in a zero position where the images are completely superimposed.

FIGURE 13 is illustrative of a region of the filament which is in sharp focus indicated at 176 when the filament is traversing path A through the optical field 173. FIGURE 14 illustrates the filament image 178 in sharp focus when the filament is traversing the straight line position represented at B. FIGURE 15 illustrates the filament image 180 in focus in the optical field when the filament is traversing the path indicated at C in FIGURE 12.

The circled area 182 in FIGURES 13, 14 and 15 is representative of the optical field through which the filament 18c moves in its traverse from the feeder. By manipulating the image doubling or polarizing prism 65 which is incorporated in the apparatus shown in FIGURE 12 in the same manner as illustrated in FIGURE 4, the images 176, 178 and 180 are shifted or moved so that the relation of the dual images of the filaments may be utilized as the end point in determining filament diameter. Through the use of the arrangement illustrated in FIGURE 12, a reading or indication of the diameter of the selected filament may be determined without affecting the normal path of traverse of the filament.

FIGURE 16 is illustrative of a mounting of the optical system whereby the same may be adjusted to obtain readings or indications of any selected filament of a group or row of filaments. As shown in FIGURE 16 a forehearth 10c equipped with a feeder 12c formed with orifices 14c through which flow streams of glass or other filament-forming material which are attenuated to filaments 18c in the manner hereinbefore described.

Secured to the feeder 12c or other suitable support is a bracket 185 formed with a bar or portion 187 of T-shaped cross section, the bar extending parallel with and longitudinally of the feeder 12c and therefore parallel with the rows of filaments. Slidably mounted upon the bar 187 is a member 189 which may be clamped by a bolt 190 or other means to a housing member 192 forming a continuation of housing 33 which supports the optical system, the extension 192 being utilized when the source of incident light is not required as where transmitted light from the intensely hot feeder supplies the illumination for delineating the filament images.

The housing extension 192 supports the lens arrangement or objective 76, and where the arrangement is disposed in proximity to the glass streams, the same may be provided with a jacket 194 connected with inlet and outlet tubes 196 and 197 for conveying coolant such as water or other fluid through the jacket to maintain the objective at a safe operating temperature. The member 189 is provided with a T-shaped slot to receive the bar 187 and with a projection 191 equipped with a clamping screw 193 for locking member 189 in adjusted position.

The indication diagrammatically illustrated in FIGURE 6 is utilized and the image doubling prism adjusted until the filament images are visually touching without any superpositioning of the images or any light visible between the images. It is to be understood that incident light from a light source 86 shown in FIGURE 4 may be used and the relative position of bands of reflected light employed to determine filament size.

As shown in FIGURE 16, the angular relationship of the path of traverse of the filament and the optical axis of the apparatus can be attained through the use of a 45° prism 200 disposed between the filament being measured and the objective lens with the optical system disposed in a substantially horizontal axis as shown in FIGURE 16.

FIGURE 17 is illustrative of the position of the optical system in conjunction with a prism 202 which provides an optical scanning axis of the optical field inclined downwardly at an angle of approximately 45° to the horizontal axis of the optical system.

This arrangement has the additional advantage that incident light from the light source 86 shown in FIGURE 4 is used so that during observation or scanning of the filament during a measuring operation, the transmitted light from the intensely hot feeder does not impair or interfere with the employment of the indicating system using reflected light bands provided by the incident light source 86.

It is to be understood that in the methods of obtaining comparisons or measurements of filament or body diameters, where transmitted light is employed, that is, radiant light from the feeder and molten glass or the use of a light source spaced from the optical system, the edges of the two filament images formed or provided by the image doubling or Wollaston prism are used to obtain the end point or reading of the filament or body diameter. When reflected or incident light is used, that is, light from a source such as at 86 shown in FIGURE 4, the indications or readings represented in FIGURES 7 and 8 utilizing bands of reflected light provide a sharply defined and accurate indication for determining the diameter of a moving filament or body.

It has been found that where reflected bands of light are utilized or employed for the end point readings, that the narrower the light bands, the more accurate the visual relative positions of the light bands. A reduction in the visual width of the light bands may be attained by employment of an opaque mask fashioned with a narrow annular opening through which the incident light from a source 86 is projected.

The opaque mask visually reduces the width of the individual bands or strips of reflected light on the filament image. When a mask of this character is utilized, the intensity of the source of light should be proportionately increased in order to obtain sharply defined light bands. If desired, the reflected light bands may be colored in order to obtain increased visual sensitivity of the relative positions of the bands. For example, a split red and green filter may be used in the light system whereby one reflected band will be colored red and the other will be colored green.

To obtain an end point reading with a filter arrangement, the image doubling prism is rotated and when the green line of one image of the filament is superposed on the red line or band of the other image, a color change is effected and the superposed color images become white. This condition obtains when the correct setting of the prism 65 is established in indicating the diameter of a filament.

It has been found that by incorporating a split polarizing filter in the optical system, a visual end-to-end abutting of filament images or light band images may be effected. A polarizing filter 209 of this character is indicated diagrammatically in FIGURE 18 in which the light rays 210 are polarized through 90° with respect to the light rays indicated at 212. Through the use of a split polarizing filter, the multiple images produced by the Wollaston or image doubling prism are polarized 90° out of phase with respect to each other.

FIGURE 19 is an enlarged diagrammatic representation of the abutting condition of filament images and reflected light bands when a split polarized filter of the character illustrated in FIGURE 18 is employed. In FIGURE 19, the span indicated at D is the representation of one filament image and the span indicated at E is representative of the other filament image which visually appear in abutting relation but out of alignment. Light bands 214 and 215 are visually reflected from one image while visually reflected bands 216 and 217 are provided by the other image. The end point or correct indication of filament diameter may be accurately determined by utilizing the aligned abutting relation of the light bands 215 and 217 as shown in FIGURE 19. The condition of visual alignment of the light bands in abutting relation provides an extremely accurate visual indication of the diameter of a filament or body being measured. In FIGURE 19, the broken lines 218 indicate the reflected light bands which are not visible because of the 90° polarization by the filter 209. The broken lines 220 indicate the edges of the images which are not visible because of the 90° polarization.

The method and apparatus of the invention have been described herein as being especially adaptable for measuring diameters of extremely fine continuous filaments of glass or other material wherein the images may be amply magnified in order to secure extremely accurate indications of the diameters of the filaments.

The method and apparatus are adapted for obtaining the measurement of moving bodies or comparison of sizes of linear materials of various kinds and the adaptation of the method and apparatus is contemplated or is usuable for determining the diameters of drawn wire, extruded tubing or any material which is sized by means of a die and wherein the die may be subject to wear thereby effecting a change in the diameter of the linear material.

The method and apparatus are usable for determining the thickness of a coating or layer of material upon a filament or body of known size and is continuously available for securing comparative readings whereby deviations from a standard may be instantly ascertained. The instrument or apparatus is admirably suited as a quality control implement for continuously monitoring a moving body to ascertain any deviation from a predetermined size.

It will be apparent that, within the scope of the invention, modifications and different arrangements may be made other than as herein disclosed, and the present disclosure is illustrative merely, the invention comprehending variations thereof, as defined in the claims.

I claim:

1. Apparatus for measuring the size of a linear body while the same is moving in the direction of its length including, in combination, a frame, a movable carriage supported on the frame, an image multiplying element mounted on the carriage, a magnifying lens system associated with the element, means for guiding the linear body through the optical field of the lens system, a light source, means for directing an annular beam of light onto the linear body in the optical field, a member bearing graduations mounted on said carriage, an indicating means for cooperation therewith, means for rotating said element relative to the carriage for establishing a predetermined relation of the optical positions of the multiple images of the linear body and concomitantly actuating the indicating means relative to the member bearing graduations for indicating the size of the linear body when said predetermined relation of the optical positions of the images is attained.

2. Apparatus for determining the diameter of a light reflective body continuously moving in a direction of its length including, in combination, a support, a magnifying lens system carried by the support, means for guiding the body through the optical field of the lens system, an image multiplying element associated with the lens system, a light source, means for directing an annular condensed beam of light from the light source onto the moving body in the optical field whereby bands of light are reflected from the body, means for adjusting the position of said image multiplying element for varying the relative optical position of the multiple images of the bands of light, means bearing graduations representing filament diameters, and an indicator associated with said element adjusting means and cooperating with said graduations for indicating the diameter of the moving body.

3. Apparatus for measuring the size of a linear body while the same is moving in the direction of its length including, in combination, a support, a housing carried by the support, an optical system associated with the housing including magnifying lenses, means for guiding the linear body through the optical field of the optical system, an image doubling element movably supported by the housing, indicating means associated with the image doubling element, an enclosure associated with the housing, a source of illumination disposed in the enclosure, an annular light reflecting means, a light condensing lens arrangement, said light reflecting means and condensing lens arrangement being disposed to direct incident light onto the linear body in the optical field, said image doubling element forming images of bands of light reflected from the linear body, said indicating means including a member bearing graduations and cooperating indicator for indicating the relative positions of the reflected bands of light to determine the size of the linear body.

4. Apparatus for determining the diameter of a moving linear body including, in combination, a housing, means for supporting the housing adjacent a moving linear body, a member carried by the housing, a magnifying lens arrangement associated with the member, an image doubling prism formed with a constant angle of deviation optically associated with the lens arrangement, a movable support for the prism, means for guiding said linear body through the optical field of the lens arrangement, a light source, means for directing an annular beam of light onto the linear body in the optical field, relatively stationary and movable indicating members associated with housing and prism support, and means for moving the prism and indicating member whereby to determine the diameter of the moving body through the visual relative position of the images produced by the image doubling prism.

5. Apparatus of the character disclosed, in combination with means for feeding streams of filament-forming material from a supply and means attenuating the streams to filaments, a support positioned adjacent the stream feeding means, a housing, a magnifying lens system associated with the housing, means for adjusting the housing relative to the support, guide means for directing at least one of the moving filaments through the optical field, a light source, means for directing an annular condensed beam of light from the source onto the filament in the optical field, an image multiplying medium in said housing associated with the lens system, said medium being relatively movable for optically changing the visual positions of the images of the moving filament, and indicating movable concomitantly with said medium and correlated with the relative positions of the multiple images for indicating the diameter of the moving filament.

6. Apparatus of the character disclosed, in combination with means for feeding streams of filament-forming material from a supply and means attenuating the streams to filaments, a support positioned adjacent the stream feeding means, a housing carried by the support, a magnifying lens system associated with the housing, guide means associated with said lens system arranged to guide at least one of the moving filaments through the optical field area, a light source, means for directing an annular condensed light beam from said source onto the filament in the optical field area, an image multiplying prism associated with the lens system, said prism being relatively movable for optically changing the visual positions of the images of the moving filament, and indicating means controlled by movement of said prism for indicating the diameter of the moving filament.

7. Apparatus of the character disclosed, in combination with means for feeding streams of filament-forming material from a supply and attenuating the streams to filaments, a support positioned adjacent the stream feeding means, a housing carried by the support, a tubular member supported by the housing, a lens system associated with the tubular member including an objective and an eye piece arranged to provide substantial magnification of a moving filament, said housing being adjustable relative to said support whereby the lens system may be selectively focused on one of the moving filaments, a multiple image-forming prism associated with the lens system, means for rotating said prism whereby to adjust the relative visual positions of the filament images established by the prism, filament diameter indicating means including a calibrated element and an indicating element, one of said elements being rotatable with said prism and the other relatively stationary whereby to directly indicate the diameter of a moving filament as determined by the visual relation of the multiple images.

8. In combination, apparatus as in claim 7 and having a polarizing means cooperating with the multiple image-forming prism for establishing a visual abutting relation of the images.

9. Apparatus for indicating the diameter of a linear body while the same is moving in the direction of its length including, in combination, a support positioned adjacent the moving linear body, a housing carried by the support, an optical system associated with the housing including magnifying lenses, said optical system being adjustable relative to the support whereby the lens system may be focused on the moving linear body, a multiple image-forming prism associated with the lens system, means for effecting relative rotational movement between the lens system and the multiple image-forming prism whereby to adjust the relative visual positions of the body images established by the prism, body diameter indicating means including a calibrated element and an indicating element, one of said elements being connected with the lens system and the other connected with the image-forming prism whereby the relative optical position of the lens system with respect to the prism as determined by the relation of the multiple images indicates the diameter of the moving linear body through the medium of the elements.

References Cited in the file of this patent

UNITED STATES PATENTS

| | | |
|---|---|---|
| 2,226,677 | Vikhman | Dec. 31, 1940 |
| 2,592,039 | Laetsch et al. | Apr. 8, 1952 |
| 2,730,008 | McGinn | Jan. 10, 1956 |
| 2,841,048 | Duncan et al. | July 1, 1958 |

FOREIGN PATENTS

| | | |
|---|---|---|
| 308,080 | Great Britain | Mar. 21, 1929 |
| 324,124 | Great Britain | Jan. 23, 1930 |
| 541,795 | Germany | Jan. 15, 1932 |

OTHER REFERENCES

Manual of Petrographic Methods, Johannsen, A., Second edition 1918, published by McGraw-Hill Book Co., New York, pps. 62–65.